United States Patent
Patterson

(10) Patent No.: US 9,530,131 B2
(45) Date of Patent: *Dec. 27, 2016

(54) TRANSACTION PROCESSING USING A GLOBAL UNIQUE IDENTIFIER

(71) Applicant: VISA U.S.A. INC., San Francisco, CA (US)

(72) Inventor: Barbara Elizabeth Patterson, South San Francisco, CA (US)

(73) Assignee: VISA U.S.A. INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,749

(22) Filed: Oct. 7, 2015

(65) Prior Publication Data

US 2016/0027012 A1    Jan. 28, 2016

Related U.S. Application Data

(63) Continuation of application No. 14/020,276, filed on Sep. 6, 2013, now Pat. No. 9,183,555, which is a
(Continued)

(51) Int. Cl.
*G06Q 20/40* (2012.01)
*G06Q 20/02* (2012.01)
(Continued)

(52) U.S. Cl.
CPC ............ *G06Q 20/401* (2013.01); *G06Q 20/02* (2013.01); *G06Q 20/0855* (2013.01);
(Continued)

(58) Field of Classification Search
CPC .. G06Q 20/102; G06Q 20/10; G06Q 30/0601; G06Q 20/04; G06Q 20/12; G06Q 20/20; G06Q 20/40; G06Q 40/12; G06Q 20/02; G06Q 20/32; G06Q 20/382; G06Q 30/00; G06Q 30/02; G06Q 30/0215; G06Q 30/0226; H04L 63/08; H04L 63/18
(Continued)

(56) References Cited

U.S. PATENT DOCUMENTS 5,465,206 A    11/1995    Hilt et al.
5,477,038 A    12/1995    Levine et al.
(Continued)

FOREIGN PATENT DOCUMENTS

EP    2156397 A1    2/2010
KR    1998-072136    10/1998
(Continued)

OTHER PUBLICATIONS

Wang, U.S. Appl. No. 62/000,288, Payment System Canonical Address Format filed on May 19, 2014, unpublished.
(Continued)

*Primary Examiner* — Behrang Badii
*Assistant Examiner* — Sanjeev Malhotra
(74) *Attorney, Agent, or Firm* — Kilpatrick, Townsend & Stockton LLP.

(57) ABSTRACT

A Globally Unique IDentifier (GUID) is used to match an authorization request with an authorization response for a transaction between a merchant and a consumer upon an account within a payment processing system where the payment amount is unknown until after the merchant receives the authorization response that includes the GUID. After receiving the authorization response and when the payment amount is known, the merchant forms a transmission that has information for delivery to an issuer of the account. This information is sufficient for the issuer to forward the payment amount from the account to pay the
(Continued)

merchant for the transaction. While including the GUID and the payment amount, the information does not include an identifier of the account.

20 Claims, 5 Drawing Sheets

Related U.S. Application Data continuation of application No. 13/493,957, filed on Jun. 11, 2012, now Pat. No. 8,554,678, which is a continuation of application No. 12/182,032, filed on Jul. 29, 2008, now Pat. No. 8,219,489.

(51) Int. Cl.
| | | |
|---|---|---|
| *G06Q 20/08* | (2012.01) | |
| *G06Q 20/10* | (2012.01) | |
| *G06Q 20/38* | (2012.01) | |
| *G06Q 30/02* | (2012.01) | |
| *G06Q 40/00* | (2012.01) | |

(52) U.S. Cl.
CPC .......... *G06Q 20/10* (2013.01); *G06Q 20/102* (2013.01); *G06Q 20/382* (2013.01); *G06Q 20/385* (2013.01); *G06Q 20/40* (2013.01); *G06Q 20/4014* (2013.01); *G06Q 30/0215* (2013.01); *G06Q 40/12* (2013.12)

(58) Field of Classification Search
USPC ............ 705/14.17, 14.21, 14.27, 26.1, 26.4, 705/39, 40, 64, 78; 713/166; 700/245
See application file for complete search history.

(56) References Cited

U.S. PATENT DOCUMENTS

| | | |
|---|---|---|
| 5,500,513 A | 3/1996 | Langhans et al. |
| 5,613,012 A | 3/1997 | Hoffman et al. |
| 5,621,201 A | 4/1997 | Langhans et al. |
| 5,781,438 A | 7/1998 | Lee et al. |
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,226,624 B1 | 5/2001 | Watson et al. |
| 6,227,447 B1 | 5/2001 | Campisano |
| 6,236,981 B1 | 5/2001 | Hill |
| 6,247,129 B1 | 6/2001 | Keathley et al. |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,535,726 B1 | 3/2003 | Johnson |
| 6,560,581 B1 | 5/2003 | Fox et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,837,425 B2 | 1/2005 | Gauthier et al. |
| 6,868,391 B1 | 3/2005 | Hultgren |
| 6,879,965 B2 | 4/2005 | Fung et al. |
| 6,891,953 B1 | 5/2005 | DeMello et al. |
| 6,901,387 B2 | 5/2005 | Wells et al. |
| 6,920,611 B1 | 7/2005 | Spaeth et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,007,840 B2 | 3/2006 | Davis |
| 7,039,611 B2 | 5/2006 | Devine |
| 7,051,923 B2 | 5/2006 | Nguyen et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,104,446 B2 | 9/2006 | Bortolin et al. |
| 7,113,930 B2 | 9/2006 | Eccles et al. |
| 7,121,456 B2 | 10/2006 | Spaeth et al. |
| 7,124,937 B2 | 10/2006 | Myers et al. |
| 7,136,835 B1 | 11/2006 | Flitcroft et al. |
| 7,152,780 B2 | 12/2006 | Gauthier et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,243,853 B1 | 7/2007 | Levy et al. |
| 7,264,154 B2 | 9/2007 | Harris |
| 7,280,981 B2 | 10/2007 | Huang et al. |
| 7,287,692 B1 | 10/2007 | Patel et al. |
| 7,292,999 B2 | 11/2007 | Hobson et al. |
| 7,350,230 B2 | 3/2008 | Forrest |
| 7,350,702 B2 | 4/2008 | Bortolin et al. |
| 7,353,382 B2 | 4/2008 | Labrou et al. |
| 7,356,516 B2 | 4/2008 | Richey et al. |
| D568,388 S | 5/2008 | Hammad |
| D568,389 S | 5/2008 | Hammad |
| D568,390 S | 5/2008 | Law et al. |
| D569,424 S | 5/2008 | Law et al. |
| D569,425 S | 5/2008 | Law et al. |
| 7,367,501 B2 | 5/2008 | Bortolin et al. |
| 7,379,919 B2 | 5/2008 | Hogan et al. |
| D571,399 S | 6/2008 | Hammad et al. |
| D571,855 S | 6/2008 | Law et al. |
| D571,856 S | 6/2008 | Hammad et al. |
| 7,389,275 B2 | 6/2008 | Kemper et al. |
| RE40,444 E | 7/2008 | Linehan |
| D572,752 S | 7/2008 | Hammad |
| D573,181 S | 7/2008 | Hammad |
| D575,815 S | 8/2008 | Hammad et al. |
| D575,816 S | 8/2008 | Law et al. |
| 7,407,094 B2 | 8/2008 | Myers et al. |
| 7,415,443 B2 | 8/2008 | Hobson et al. |
| D576,207 S | 9/2008 | Hammad et al. |
| 7,427,021 B2 | 9/2008 | Kemper et al. |
| D578,158 S | 10/2008 | Hammad et al. |
| 7,444,676 B1 | 10/2008 | Asghari-Kamrani et al. |
| D580,974 S | 11/2008 | Hammad |
| 7,464,870 B2 | 12/2008 | Nguyen et al. |
| 7,469,151 B2 | 12/2008 | Khan et al. |
| D584,769 S | 1/2009 | Hammad |
| 7,482,925 B2 | 1/2009 | Hammad et al. |
| D590,875 S | 4/2009 | Law et al. |
| 7,522,905 B2 | 4/2009 | Hammad et al. |
| D592,244 S | 5/2009 | Hammad |
| D593,151 S | 5/2009 | Hammad |
| D593,152 S | 5/2009 | Hammad et al. |
| 7,527,208 B2 | 5/2009 | Hammad et al. |
| 7,548,889 B2 | 6/2009 | Bhambri et al. |
| 7,567,920 B2 | 7/2009 | Hammad et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,141 B2 | 8/2009 | Huang et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,591,412 B2 | 9/2009 | Spaeth et al. |
| 7,593,896 B1 | 9/2009 | Flitcroft et al. |
| 7,600,670 B2 | 10/2009 | Gauthier et al. |
| 7,606,560 B2 | 10/2009 | Labrou et al. |
| 7,611,054 B2 | 11/2009 | Bortolin et al. |
| 7,624,917 B2 | 12/2009 | Spaeth et al. |
| 7,627,522 B2 | 12/2009 | Monk |
| 7,627,531 B2 | 12/2009 | Breck et al. |
| 7,627,895 B2 | 12/2009 | Gifford et al. |
| 7,650,314 B1 | 1/2010 | Saunders |

(56) References Cited

U.S. PATENT DOCUMENTS

| | | |
|---|---|---|
| 7,653,602 B2 | 1/2010 | Davis |
| 7,654,451 B2 | 2/2010 | Bortolin et al. |
| 7,657,441 B2 | 2/2010 | Richey et al. |
| 7,668,785 B1 | 2/2010 | Hammad |
| 7,685,037 B2 | 3/2010 | Reiners et al. |
| 7,690,560 B2 | 4/2010 | Gauthier et al. |
| 7,694,287 B2 | 4/2010 | Singh et al. |
| 7,702,578 B2 | 4/2010 | Fung et al. |
| 7,702,916 B2 | 4/2010 | Seaton, Jr. et al. |
| 7,707,120 B2 | 4/2010 | Dominguez et al. |
| 7,711,621 B2 | 5/2010 | Huang et al. |
| 7,711,639 B2 | 5/2010 | Reid et al. |
| 7,712,655 B2 | 5/2010 | Wong |
| 7,725,369 B2 | 5/2010 | Shiftan et al. |
| 7,725,394 B2 | 5/2010 | Lal et al. |
| 7,726,561 B2 | 6/2010 | Katyal et al. |
| 7,734,527 B2 | 6/2010 | Uzo |
| 7,739,169 B2 | 6/2010 | Hammad |
| 7,740,168 B2 | 6/2010 | Hammad et al. |
| 7,742,986 B2 | 6/2010 | Steele et al. |
| 7,753,265 B2 | 7/2010 | Harris |
| 7,769,599 B2 | 8/2010 | Yanak et al. |
| 7,770,789 B2 | 8/2010 | Oder, II et al. |
| 7,774,402 B2 | 8/2010 | Singh et al. |
| 7,783,564 B2 | 8/2010 | Mullen et al. |
| 7,784,685 B1 | 8/2010 | Hopkins, III |
| 7,792,688 B2 | 9/2010 | Yanak et al. |
| 7,793,837 B1 | 9/2010 | Faith et al. |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,809,637 B2 | 10/2010 | Monk |
| 7,809,650 B2 | 10/2010 | Bruesewitz et al. |
| 7,810,165 B2 | 10/2010 | Hammad et al. |
| 7,818,264 B2 | 10/2010 | Hammad |
| 7,819,322 B2 | 10/2010 | Hammad et al. |
| 7,822,679 B1 | 10/2010 | Vaux et al. |
| 7,827,077 B2 | 11/2010 | Shiftan et al. |
| 7,828,220 B2 | 11/2010 | Mullen |
| 7,835,960 B2 | 11/2010 | Breck et al. |
| 7,840,459 B1 | 11/2010 | Loftesness et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,838,982 B2 | 9/2014 | Carlson et al. |
| 8,887,308 B2 | 11/2014 | Grecia |
| 9,065,643 B2 | 6/2015 | Hurry et al. |
| 9,070,129 B2 | 6/2015 | Sheets et al. |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 2001/0029485 A1 | 10/2001 | Brody et al. |
| 2001/0034720 A1 | 10/2001 | Armes |
| 2001/0044787 A1 | 11/2001 | Shwartz et al. |
| 2001/0054003 A1 | 12/2001 | Chien et al. |
| 2002/0007320 A1 | 1/2002 | Hogan et al. |
| 2002/0016749 A1 | 2/2002 | Borecki et al. |

(56) References Cited

U.S. PATENT DOCUMENTS

| | | |
|---|---|---|
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0087344 A1* | 7/2002 | Billings .................. G06Q 20/10 705/39 |
| 2002/0111919 A1 | 8/2002 | Weller et al. |
| 2002/0116341 A1 | 8/2002 | Hogan et al. |
| 2002/0120582 A1* | 8/2002 | Elston .................... G06Q 20/04 705/64 |
| 2002/0133467 A1 | 9/2002 | Hobson et al. |
| 2002/0138445 A1 | 9/2002 | Laage et al. |
| 2002/0147913 A1 | 10/2002 | Lun Yip |
| 2003/0023524 A1 | 1/2003 | Sugimoto et al. |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2003/0200184 A1* | 10/2003 | Dominguez ........... G06Q 20/02 705/78 |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0117300 A1 | 6/2004 | Jones et al. |
| 2004/0139008 A1 | 7/2004 | Mascavage, III |
| 2004/0143532 A1 | 7/2004 | Lee |
| 2004/0153650 A1 | 8/2004 | Hillmer |
| 2004/0158532 A1 | 8/2004 | Breck et al. |
| 2004/0210449 A1 | 10/2004 | Breck et al. |
| 2004/0210498 A1 | 10/2004 | Freund |
| 2004/0230525 A1 | 11/2004 | Barsade et al. |
| 2004/0232225 A1 | 11/2004 | Bishop et al. |
| 2004/0260646 A1 | 12/2004 | Berardi et al. |
| 2005/0005110 A1* | 1/2005 | Kim ...................... H04L 63/101 713/166 |
| 2005/0033686 A1 | 2/2005 | Peart et al. |
| 2005/0037735 A1 | 2/2005 | Coutts |
| 2005/0080730 A1 | 4/2005 | Sorrentino |
| 2005/0108178 A1 | 5/2005 | York |
| 2005/0119972 A1* | 6/2005 | Inglis .................... G06Q 20/02 705/40 |
| 2005/0131826 A1 | 6/2005 | Cook |
| 2005/0199709 A1 | 9/2005 | Linlor |
| 2005/0240531 A1 | 10/2005 | Wolff |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0253390 A1 | 11/2006 | McCarthy et al. |
| 2006/0278704 A1 | 12/2006 | Saunders et al. |
| 2007/0005188 A1* | 1/2007 | Johnson .................. H04W 4/04 700/245 |
| 2007/0055597 A1 | 3/2007 | Patel et al. |
| 2007/0055630 A1 | 3/2007 | Gauthier et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0021821 A1 | 1/2008 | Katyal et al. |
| 2008/0027861 A1* | 1/2008 | Gendler ................. G06Q 10/06 705/40 |
| 2008/0029607 A1 | 2/2008 | Mullen |
| 2008/0035738 A1 | 2/2008 | Mullen |
| 2008/0052182 A1* | 2/2008 | Marshall ............... G06Q 20/10 705/26.1 |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0059306 A1* | 3/2008 | Fordyce ................. G06Q 30/02 705/14.27 |
| 2008/0065554 A1 | 3/2008 | Hogan et al. |
| 2008/0065555 A1 | 3/2008 | Mullen |
| 2008/0086420 A1 | 4/2008 | Gilder et al. |
| 2008/0133350 A1* | 6/2008 | White ................... G06Q 20/06 705/14.27 |
| 2008/0189191 A1* | 8/2008 | Roche .................. G06Q 30/06 705/26.4 |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0249937 A1 | 10/2008 | Walls et al. |
| 2008/0283591 A1 | 11/2008 | Oder, II et al. |
| 2008/0300973 A1* | 12/2008 | DeWitt ................. G06Q 10/08 705/14.21 |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0070171 A1 | 3/2009 | Patterson |
| 2009/0076938 A1 | 3/2009 | Patterson |
| 2009/0106112 A1 | 4/2009 | Dalmia et al. |
| 2009/0106160 A1 | 4/2009 | Skowronek |
| 2009/0112757 A1* | 4/2009 | Hammad ............... G06Q 10/087 705/39 |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0182654 A1* | 7/2009 | Mullen .................. G06Q 20/04 705/30 |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0169170 A1* | 7/2010 | Fordyce, III ........ G06Q 30/0215 705/14.17 |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |

(56) References Cited

U.S. PATENT DOCUMENTS

| | | |
|---|---|---|
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | Mccullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("J.D."), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |

(56) References Cited

U.S. PATENT DOCUMENTS

| | | |
|---|---|---|
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |

FOREIGN PATENT DOCUMENTS

| | | |
|---|---|---|
| KR | 10-0299010 | 10/2001 |
| KR | 10-2001-0094823 | 11/2001 |
| KR | 2002-0013621 | 2/2002 |
| KR | 10-2004-0002035 | 1/2004 |
| WO | 0135304 A1 | 5/2001 |
| WO | 0135304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Sharma et al., U.S. Appl. No. 62/003,717, Mobile Merchant Application filed on May 28, 2014, unpublished.

Kalgi et al., U.S. Appl. No. 62/024,426, Secure Transactions Using Mobile Devices filed on Jul. 14, 2014, unpublished.

Prakash et al., U.S. Appl. No. 62/037,033, Sharing Payment Token filed on Aug. 13, 2014, unpublished.

Hoverson et al., U.S. Appl. No. 62/038,174, Customized Payment Gateway filed on Aug. 15, 2014, unpublished.

Wang, U.S. Appl. No. 62/042,050, Payment Device Authentication and Authorization System filed on Aug. 26, 2014, unpublished.

Gaddam et al., U.S. Appl. No. 62/053,736, Completing Transactions Without a User Payment Device filed on Sep. 22, 2014, unpublished.

Patterson, U.S. Appl. No. 62/054,346, Mirrored Token Vault filed on Sep. 23, 2014, unpublished.

Dimmick, U.S. Appl. No. 14/952,514, Systems Communications With Non-Sensitive Identifiers filed on Nov. 25, 2015, unpublished.

Dimmick, U.S. Appl. No. 14/952,444, Tokenization Request Via Access Device filed on Nov. 25, 2015, unpublished.

Prakash et al., U.S. Appl. No. 14/955,716, Provisioning Platform for Machine-To-Machine Devices filed on Dec. 1, 2015, unpublished.

Wong et al., U.S. Appl. No. 14/966,948, Automated Access Data Provisioning filed on Dec. 11, 2015, unpublished.

Stubbs et al., U.S. Appl. No. 62/103,522, Methods and Systems for Wallet Provider Provisioning filed on Jan. 14, 2015, unpublished.

McGuire, U.S. Appl. No. 14/600,523, Secure Payment Processing Using Authorization Request filed on Jan. 20, 2015, unpublished.

Flurscheim et al., U.S. Appl. No. 15/004,705, Cloud-Based Transactions With Magnetic Secure Transmission filed on Jan. 22, 2016, unpublished.

Flurscheim et al., U.S. Appl. No. 62/108,403, Wearables With NFC HCE filed on Jan. 27, 2015, unpublished.

Sabba et al., U.S. Appl. No. 15/011,366, Token Check Offline filed on Jan. 29, 2016, unpublished.

Patterson, U.S. Appl. No. 15/019,157, Token Processing Utilizing Multiple Authorizations filed on Feb. 9, 2016, unpublished.

Cash et al., U.S. Appl. No. 15/041,495, Peer Forward Authorization of Digital Requests filed on Feb. 11, 2016, unpublished.

Le Saint et al., U.S. Appl. No. 15/008,388, Methods for Secure Credential Provisioning filed on Jan. 27, 2016, unpublished.

Kinagi, U.S. Appl. No. 62/117,291, Token and Cryptogram Using Transaction Specific Information filed on Feb. 17, 2015, unpublished.

Galland et al. U.S. Appl. No. 62/128,709, Tokenizing Transaction Amounts filed on Mar. 5, 2015, unpublished.

Rangarajan et al., U.S. Appl. No. 61/751,763, Payments Bridge filed on Jan. 11, 2013, unpublished.

Li, U.S. Appl. No. 61/894,749, Methods and Systems for Authentication and Issuance of Tokens in a Secure Environment filed on Oct. 23, 2013, unpublished.

Aissi et al., U.S. Appl. No. 61/738,832, Management of Sensitive Data filed on Dec. 18, 2012, unpublished.

Wong et al., U.S. Appl. No. 61/879,362, Systems and Methods for Managing Mobile Cardholder Verification Methods filed on Sep. 18, 2013, unpublished.

Powell, U.S. Appl. No. 61/892,407, Issuer Over-The-Air Update Method and Systems filed on Oct. 17, 2013, unpublished.

Powell, U.S. Appl. No. 61/926,236, Methods and Systems for Provisioning Mobile Devices With Payment Credentials and Payment Token Identifiers filed on Jan. 10, 2014, unpublished.

Petition for Inter Partes Review of U.S. Pat. No. 8,533,860 Challenging Claims 130 Under 35 U.S.C. § 312 and 37 C.F.R. § 42.104,

(56) References Cited

OTHER PUBLICATIONS filed Feb. 17, 2016, Before the USPTO Patent Trial and Appeal Board, IPR 2016-00600, 65 pages.
Office Action of Aug. 5, 2010 in related U.S. Appl. No. 12/205,112.
Office Action of Jan. 19, 2011 in related U.S. Appl. No. 12/205,112.
Search/Examination Report dated Nov. 26, 2009 from International Application No. PCT/US2008/075694, 13 pages.

* cited by examiner

TRANSACTION PROCESSING USING A GLOBAL UNIQUE IDENTIFIER

CROSS-REFERENCES TO RELATED APPLICATIONS

This application is a continuation of U.S. patent application Ser. No. 14/020,276 filed on Sep. 6, 2013, which is a continuation of U.S. patent application Ser. No. 13/493,957 filed on Jun. 11, 2012 now U.S. Pat. No. 8,554,678, issued on Oct. 8, 2013, which is a continuation of U.S. patent application Ser. No. 12/182,032 filed on Jul. 29, 2008 now U.S. Pat. No. 8,219,489, issued Jul. 10, 2012, the disclosures of which are all herein incorporated by reference.

FIELD

Implementations generally relate to processing of transactions, and more particularly, to processing transactions within a payment processing system, and most particularly to processing transactions upon a corresponding account within a payment processing system using Globally Unique IDentifier (GUID) that is associated with the transaction.

BACKGROUND

Multiple activities are involved in processing a transaction between a consumer and a merchant for a product or service that is payable upon an account issued to the consumer by an issuer within a payment processing system. Typically, processing of the transaction involves an authorization activity followed by a clearing and settlement activity (collectively "remittance"). Clearing includes the exchange of financial information between the issuer and an acquirer of the merchant and settlement includes the transfer of funds.

Referring to FIG. 1, a cross-functional flow chart depicts an exemplary method of authorizing and remitting a transaction using an account identifier of the account. When the merchant and the consumer engage in the transaction, the consumer may give the merchant the account identifier (e.g., the account number) of a corresponding account of the consumer upon which the transaction is to be made payable. The account identifier is then used throughout both the authorization and the remittance of the transaction to distinguish the transaction from among many of the transactions.

At a step 102, the merchant may transmit to the issuer, via an acquirer, an authorization request including the account identifier and a quantity of funds to be authorized by the issuer. The acquirer forwards the authorization request to a transaction handler who in turn forwards the authorization request to the issuer. At step 106, the issuer verifies whether the account identifier is valid or whether the balance of the account corresponding with the account identifier can cover the quantity of funds. The issuer forms, for forwarding to the merchant, an authorization response to the authorization request including the account identifier. Depending on the response to the authorization request, the merchant may release the good and/or service to the consumer or decline releasing of the good or service to the consumer at a step 110.

Several verifications can occur during the authorization. For instance, the issuer may verify (i) the integrity of the account; (ii) an available balance of the account as greater than or equal to the payment (e.g., the quantity of funds to be authorized by the issuer); (iii) that the account is an account that the issuer issued to the consumer; or (iv) a combination of the forgoing. The transaction handler may evaluate the authorization request to determine if the authorization request is populated according to predetermined standards, or the transaction handler may verify that the account is part of a loyalty program within the payment processing system. The acquirer may verify that the acquirer is associated with the merchant. Moreover, a risk analysis may be done on the account to determine a likelihood that there will be a successful clearing and settling of the payment from the account based on features of the account such as: the category of the account (e.g., gold card versus platinum card), the geographical location of the branch of the issuer where the account was first opened, a past transaction history of the account including a rate at which multiple past remittances were successfully conducted, or a combination thereof.

Similarly, during remittance, the account identifier is used to route the payment to the merchant and to match the payment with the corresponding authorization. At a step 114, the merchant may batch multiple clearing and settling requests of multiple transactions into one transmission, wherein each clearing and settling request in the batch is associated with a corresponding account identifier. The transmission for the batch is submitted by the merchant to its acquirer who in turn forwards the batch to the transaction handler. The acquirer or the transaction handler use the account identifier to sort the transactions within the batch based on each corresponding payment processing system of the account (e.g., Visa, MasterCard, or American Express). At a step 116, the transaction handler uses the account identifier of each corresponding clearing and settling request within the received batch to determine which issuer should receive the corresponding clearing and setting request.

At a step 118, the issuer receives the corresponding clearing and settling requests each including a corresponding account identifier. For each clearing and settling request, the issuer withdraws the payment from the account corresponding to the account identifier and forwards the payment to an issuer clearing bank. At a step 120, the issuer clearing bank forwards the payment associated with the account identifier to a transaction handler settlement bank. At a step 122, the transaction handler settlement bank forwards the payment associated with the account identifier to an acquirer settlement bank. At a step 124, the acquirer settlement bank forwards the payment associated with the account identifier to the acquirer. At a step 126, the acquirer makes the payment associated with the account identifier available to the merchant. Finally, at a step 128, the merchant receives the payment and uses the associated account identifier to balance the accounting of the transaction, such as by matching the payment with a corresponding authorization response from among a plurality of authorization responses.

Other steps that the transaction handler, or other entities within the payment processing system, may conduct during remittance include: adjudicating the final quantity of funds, determining how the payment can be transferred from the issuer to the acquirer, evaluating fees that may apply in transferring the funds, applying a foreign-to-domestic currency conversion, if applicable, or a combination thereof.

Reliance on the account identifier, in whole or in part, to distinguish the transaction from among the plurality of transactions within the payment processing system exposes the corresponding consumer to risks. For example, the merchant may locally store a plurality of the account identifiers for later submission of corresponding clearing and settling requests. Storing the account identifier of a corresponding consumer may pose risks to the corresponding consumer such as when unauthorized access to the stored account identifier leads to theft, fraud, or credit damage.

The foregoing points out a need to provide secure processing of authorization and remittance of transactions payable upon the account within the payment processing system.

SUMMARY

In one implementation, a computer implemented method is disclosed wherein a transaction between a merchant and a consumer upon an account issued to the consumer by an issuer within a payment processing system is processed using a Globally Unique IDentifier ("GUID") that is associated with the transaction. The GUID is unique within the payment processing system such that the GUID is unique among multiple of the GUIDs each associated with a corresponding transaction. An authorization request for the transaction is received having: a preliminary quantity of funds to be authorized for the transaction by the issuer; a code for the transaction that is unique among a plurality of said transactions of the merchant; and an account identifier of a corresponding account. The GUID is associated with the transaction. A first transmission is formed having information for delivery to the issuer and usable to form an authorization response responding to the authorization request for the transaction, wherein the information includes the GUID. The authorization response of the issuer is received, including the GUID but not the account identifier of the account. The authorization response is associated with the authorization request by, at least, matching the GUID associated the transaction, with the GUID received in the authorization response.

A second transmission containing information for delivery to the merchant is formed, wherein the information does not including the account identifier but includes: the authorization response; the GUID; and the code for the transaction. A third transmission is received including: the GUID; and a final quantity of funds for the transaction. A fourth transmission is received having information for delivery to the issuer and usable to forward the final quantity of funds for the transaction from the account to pay the merchant for the transaction.

In another implementation, a payment processing system comprises a merchant and a consumer engaging in a transaction that has been authorized with an authorization by an issuer as being payable upon an account issued to the consumer by the issuer within the payment processing system. The account is associated with an account identifier. A payment amount of the transaction is unknown until after the merchant receives the authorization from the issuer. After receiving the authorization, the merchant submits to the payment processing system at least: the payment amount, and an associated Globally Unique IDentifier (GUID) that is unique within the payment processing system and is independent of the account identifier, whereby the transaction is distinguished by the GUID from a plurality of the transactions within the payment processing system. Subsequent to receiving the authorization from the issuer, the merchant does not submit the account identifier to the acquirer or the transaction handler.

In yet another implementation, an authorization request for the transaction is formed having: a preliminary quantity of funds to be authorized for the transaction by the issuer; a code for the transaction that is unique among a plurality of the transactions of the merchant; and an account identifier of the account. An authorization response of the issuer is received responding to the authorization request and not including the account identifier, but including the code for the transaction and the GUID. The GUID received in the response is associated with the transaction by, at least, matching the code for the transaction in the authorization request with the code for the transaction received in the authorization response. When the response includes an indication that the transaction has been authorized: the good or the service is released to the consumer; and a transmission is formed including: the GUID, and a final quantity of funds for the transaction that is to be the payment for the transaction from the account, wherein the transmission does not include the account identifier. A notification is received indicating that the payment amount from the account has been forwarded to the acquirer.

BRIEF DESCRIPTION OF THE DRAWINGS

Implementations will become more apparent from the detailed description set forth below when taken in conjunction with the drawings, in which like elements bear like reference numerals.

DETAILED DESCRIPTION

Processing of a payment between a consumer and a merchant for a transaction is addressed in various exemplary implementations described for a payment processing system. Within the payment processing system, a transaction handler processes a transaction characterized by the consumer and the merchant engaging in the transaction upon an account that has been issued to the consumer by an issuer. The account may be a credit, a prepaid, a debit, a line of credit, a deposit, or a loan account, for example. Alternatively, or in combination, the account may be a flexible spending account or a health savings account. The merchant may be a retailer, a wholesaler, a reseller, a manufacturer, or a distributor, for example. If the merchant is engaged in a transaction to sell to another merchant, then the latter is deemed to be a consumer.

Figure 1:
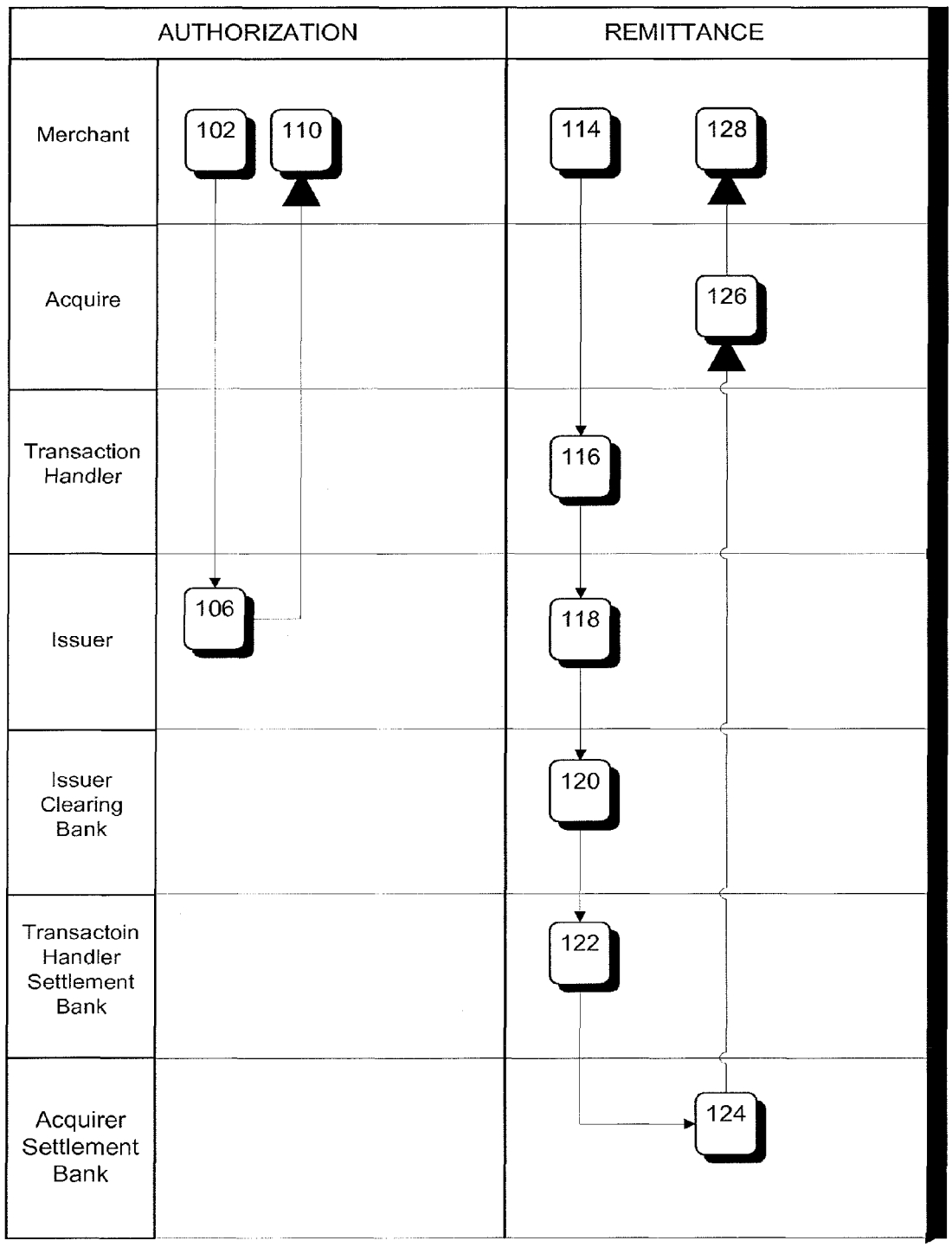
FIG. 1 depicts a cross-functional flow chart illustrating an exemplary prior art process for authorizing and remitting a transaction using a corresponding account identifier.
Figure 2:
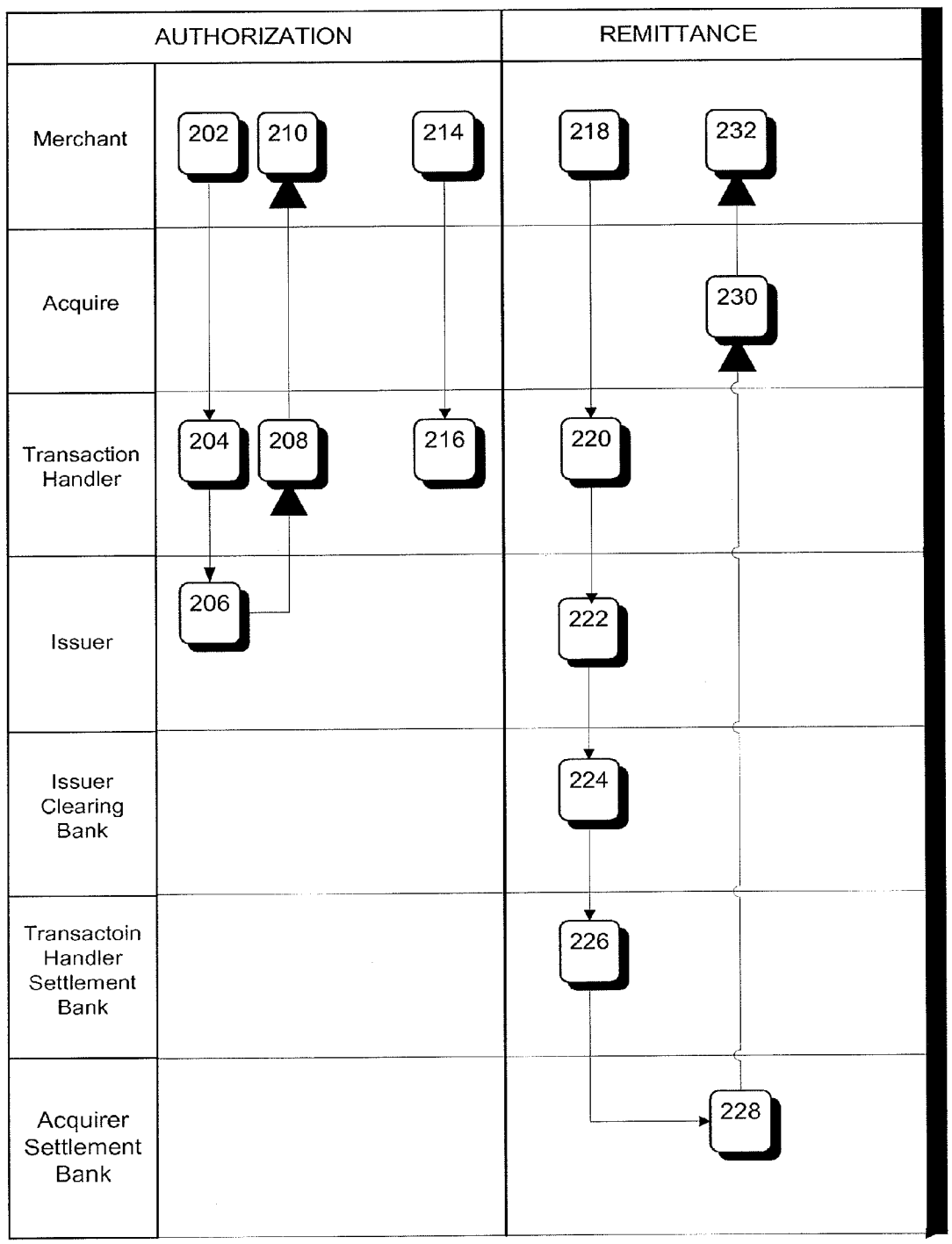
FIG. 2 depicts a cross-functional flow chart illustrating an exemplary implementation in which a Globally Unique Identifier (GUID) is used in both authorization and remittance of a transaction, wherein a final quantity of funds to pay for the transaction is unknown until after the authorization.

Referring to FIG. 2, a cross-functional flow chart depicts an exemplary implementation in which a Globally Unique IDentifier ("GUID") is used in both authorization and remittance of a transaction within a payment processing system. At a step 202, a merchant may obtain an account identifier for an account from a consumer prior to legally transferring goods or services of a transaction to the consumer. The merchant may submit an authorization request that includes the account identifier and a preliminary quantity of funds to be authorized to a transaction handler via the merchant's acquirer.

At a step 204, the transaction handler may receive the authorization request and derive the GUID. The GUID will be unique within the payment processing system. As such, the GUID that is associated with the transaction will be unique among all such GUIDs, where each GUID is associated with one transaction of one merchant among many such transactions of many such merchants. The GUID may be independent of the account identifier such that the GUID is not derived using the account identifier. For example, the GUID can be generated using a combination of a date of the transaction and either a sequential number or a number that is generated by using a pseudo random number generator.

The transaction handler associates the transaction with the GUID. For example, the transaction handler may store indicia about the transaction along with the corresponding GUID in a database. Thereafter, the GUID, rather than the account identifier, can be included in transmissions during the processing of the corresponding transaction within the payment processing system (e.g., authorization, remittance, chargeback, representment, adjustment, or clearing or settling of money from sponsors towards a loyalty program). To illustrate, the transaction handler may form a transmission including the GUID and a request to refund a payment of a consumer from the merchant back to the account when the consumer returns the good or service purchased during the transaction. In another example, the merchant may sponsor a loyalty program in which the consumer receives an incentive (e.g., a credit shown on an account statement) if the transaction of the consumer satisfies a criterion of the loyalty program, such as using a credit card to pay for Sears® brand hand tools. Sears may form a transmission addressed to the transaction handler, where the transmission includes the GUID associated with the transaction that satisfies the criterion and also includes a request that money be transferred from Sears to the issuer in an amount equal to a value of the incentive.

At a step 206, the issuer forms an authorization response to the authorization request, such as a verification that the account is valid. The authorization response is addressed to the transaction handler and includes the GUID but not the account identifier. At step 208, the transaction handler matches the GUID, which was received from the issuer in the authorization response, with the GUID that is associated with the transaction. For example, the transaction handler may match the GUID received in the authorization response with the GUID that is stored in the database along with other information that is related to the corresponding transaction. The transaction handler forms a transmission addressed to the merchant via the acquirer that includes the authorization response and the GUID, but not the account identifier. At a step 210, the merchant may determine whether to legally transfer the goods or services of the transaction to the consumer based on the authorization response. Thereafter, the merchant may store the GUID instead of, or in place of, the account identifier for use as a tag in subsequent processing of the transaction. At a step 214, the merchant may transmit a final quantity of funds along with the GUID to the transaction handler. At a step 216, the transaction handler can match the received GUID in the transmission, that also includes the final quantity of funds, with the GUID associated with the transaction in order to associate the final quantity of funds with the corresponding transaction. For example, the transaction handler may store the final quantity of funds in the database in association with the corresponding transaction.

The preliminary quantity of funds may be different from the final quantity of funds because the final quantity of funds may be uncertain at the time of submission of the authorization request. The final quantity of funds required to pay for all costs in a transaction may be a function of a variable, such as a quantity of time that a service is rendered to a consumer. For example, when a hotel patron first checks into a hotel, the hotel patron may begin a transaction by giving a corresponding account identifier to a hotel operator. The hotel operator may submit an authorization request with an estimate of a cost for a hotel stay of the hotel patron receiving an authorization response that includes a corresponding GUID. When the hotel patron checks out of the hotel, the hotel operator can determine all costs involved in the hotel stay and submit the corresponding GUID along with a corresponding final quantity of funds for the hotel stay in a transmission to the transaction handler via a corresponding acquirer.

Other examples of merchants conducting transaction for which the final quantity of funds is unknown at the time of authorization are as follows: a restaurant requiring an account number to hold a reservation for a dining transaction, a manufacturer requiring an account number before beginning a manufacturing process of unknown cost, a gas station who allows a motorist to begin fueling an automobile without knowing in advance the amount of fuel to be purchase, or a car rental company providing a motorist with a car without knowing in advance the length of the rental period. To illustrate and expand upon these examples, a diner may wish to pay a bill for a meal with a credit card. The waiter may submit an authorization request in an amount of the bill plus an estimated tip of fifteen percent (15%) of the bill, in response to which the waiter receives a credit card slip bearing only the amount of the bill. The credit card slip can then be presented to the diner who adds only ten percent (10%) of the amount of the bill, not the previously estimated 15%, as a tip for the waiter. Similarly, a retailer may order from a manufacturer "enough widgets" to produce a new line of products. The manufacturer may transmit the authorization request for an estimate of the final quantity of funds. Thereafter, the manufacturer may receive a purchase order including a quantity for the widgets and the final quantity of funds corresponding to the quantity of widgets purchased. In yet another example, a motorist may be purchasing fuel upon an account for a motor vehicle for which the quantity of fuel to be pumped into the tank of the vehicle is unknown at the time that the motorist's purchase is being authorized by a gas station. The gas station may form the authorization request with an estimate of the final quantity of funds that is predetermined by the gas station or is otherwise derived based on queries to the motorist (e.g., "How much fuel will you be purchasing today?"). Similarly, vehicle rental providers may rent a vehicle to a driver and submit an authorization request without knowing, in advance, how long and for what mileage the driver will be renting the vehicle. The vehicle rental provider will submit the final quantity of funds to the transaction handler after the vehicle has been returned by the motorist at which time both the duration of the rental and the mileage will be known.

Alternatively, or in combination, the preliminary quantity of funds may be different from the final quantity of funds because the authorization request is submitted only to check the integrity of the account rather than to obtain an indication that there is an available balance to cover the as yet unknown final quantity of funds for the transaction. For example, a nominal value, such as one dollar ($1 US) may be submitted in the authorization request to test, via an authorization response of the issuer to the authorization request, whether the account is valid.

At a step 218, the merchant forms a transmission including a clearing and settlement request along with the associated GUID of the corresponding transaction, but not the corresponding account identifier. At a step 220, the transaction handler can match the GUID, which was received in the clearing and settling request from the merchant, with the GUID associated with the transaction and log that the clearing and settling request for the transaction has been received. Once the corresponding transaction is identified, the transaction handler can send the clearing and settling request along with the GUID to the corresponding issuer in order to have the payment transferred to the merchant. At a step 222, the issuer can match the GUID received in the clearing and settling request with the corresponding transaction, such as matching the GUID in the clearing and settlement request received from the transaction handler with the GUID in the corresponding authorization response of the issuer. The issuer can withdraw the payment from the account of the consumer and forward the payment associated with the GUID to the issuer clearing bank.

At a step 224, the issuer clearing bank forwards the payment associated with the GUID to the transaction handler settlement bank. At a step 226, the transaction handler settlement bank forwards the payment associated with the GUID to the acquirer settlement bank. At a step 228, the acquirer settlement bank forwards the payment associated with the GUID to the acquirer. At a step 230, the acquirer makes the payment associated with the GUID available to the merchant. Finally, at a step 232, the merchant receives the payment. The merchant can use the associated GUID to balance the merchant's internal accounting processes as they pertain to the corresponding transaction, such as by matching the payment with a corresponding authorization response from among a plurality of such authorization responses.

Consequently, each entity within the payment processing system, such as the acquirer, can use the GUID to distinguish the transaction being processed from other transactions without relying, in whole or in part, on the account identifier. In this manner, neither the merchant, the acquirer, the transaction handler, the issuer clearing bank, the transaction handler settlement bank, the acquirer settlement bank, nor any third party agent thereof (e.g., a processor) would need to rely on the account identifier to distinguish the transaction. The benefit thereby realized is that opportunities for fraud inherent in uses of the account identifier are reduced by uses of a GUID in place of the account identifier.

Figure 3:
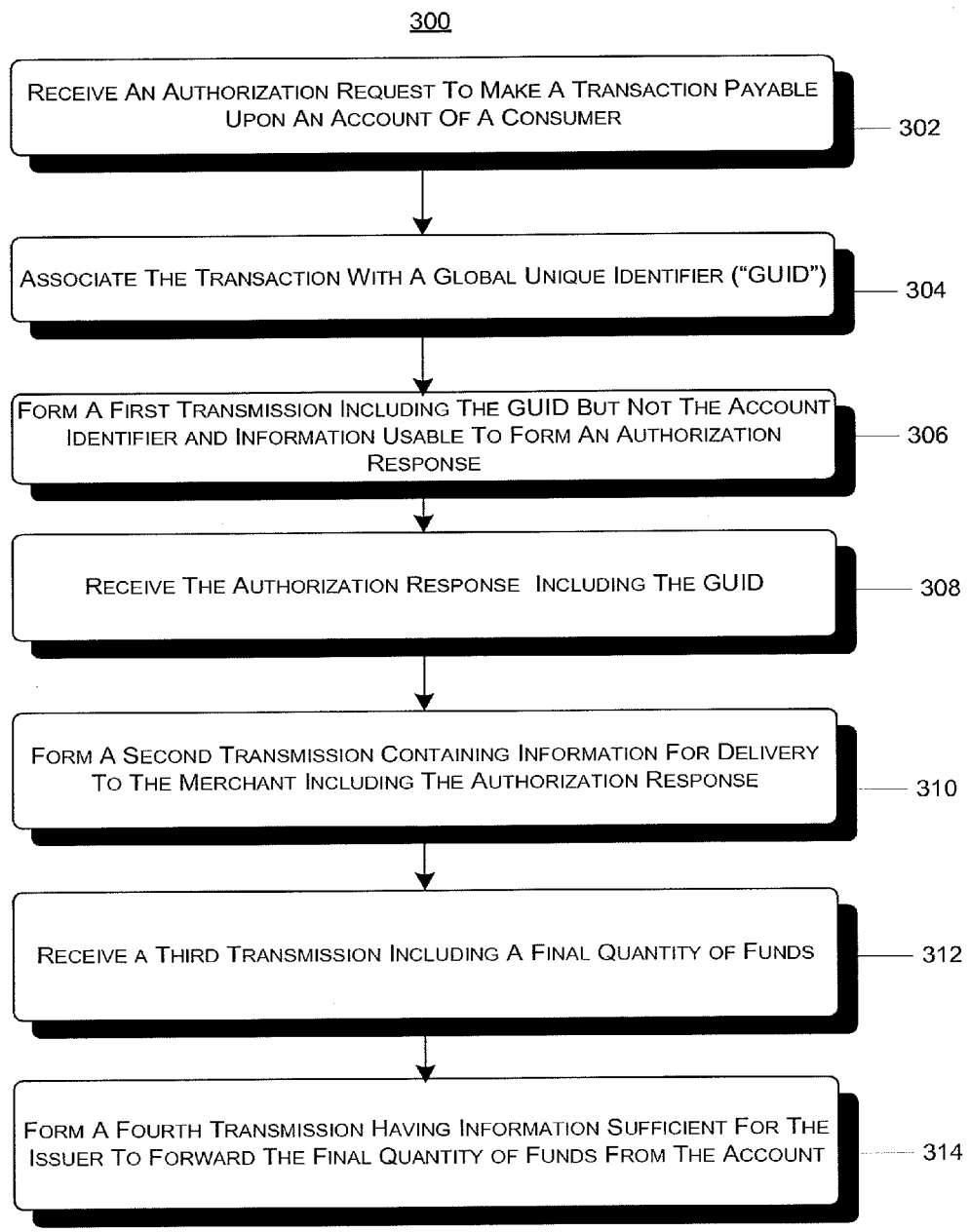
FIG. 3 depicts a flow chart of an exemplary method for authorizing, clearing and settling a transaction using a GUID, wherein a final quantity of funds to pay for the transaction is unknown until after the authorization.

Referring to FIG. 3, a flow chart of an exemplary method 300 for authorizing, clearing, and settling a transaction using a GUID is illustrated, wherein a final amount of a payment for the transaction is unknown at the time that a merchant receives a corresponding authorization response from an issuer. At a step 302, an authorization request for the transaction is received. The merchant may submit the authorization request to the acquirer for forwarding to the transaction handler. The authorization request may include a preliminary quantity of funds to be authorized for the transaction by the issuer, a code for the transaction that is unique among a plurality of the transactions of the merchant, and the account identifier. For example, the consumer may present the account identifier of the account to the merchant at a Point Of Service (POS) terminal of the merchant toward the purchase of a shipment of coffee beans. The merchant may form a transmission that includes one hundred dollars ($100.00 US) as the preliminary quantity of funds to be authorized for the transaction and the character string '4234567890123456' as the account identifier. The authorization request for the purchase of the shipment of coffee beans may also have, as the code for the transaction: the date on which the authorization request was formed; the time the authorization request was formed; a merchant identifier of the merchant; and a logical address corresponding to the location of the POS terminal. Alternatively, the merchant may create the code for the transaction using a pseudo random number generator.

The code for the transaction will preferably be unique among all of the transactions that the merchant may be engaged in, but not be unique across merchants within the payment processing system. For example, a first merchant may have a coding system wherein sequential unique numbers are assigned to each successive transaction that the first merchant is engaged in (e.g., 1, 2, 3, 4, 5, . . . 100). Similarly, a second merchant may have another coding system wherein sequential unique numbers are assigned to each successive transaction that the second merchant is engaged in (e.g., 5, 10, 15, 20 . . . 100). Consequently, both the first and the second merchants may form respective authorization requests each having the number "5" as the code for the transaction.

At a step 304, the transaction is associated with the GUID that is unique within the payment processing system across a plurality of the merchants. For example, an algorithm may be used to derive the GUID as a function of one of the parameters of the transaction, such as the merchant identifier for the merchant, the date of the transaction, a geographical indicator of the merchant (e.g., a ZIP code), or a combination thereof. The GUID will preferably be derived without relying on the account identifier such that the GUID is independent of the account identifier. For example, the GUID may be independent of the account identifier when an algorithm derives the GUID without having a corresponding account identifier of the corresponding transaction as an input to the algorithm. Alternatively, or in combination, the GUID can be derived using a pseudo random number generator.

At a step 306, a first transmission is formed having the corresponding GUID of the transaction, but not the account identifier, and information usable to form the authorization response to the authorization request for the transaction. The first transmission may include the authorization request or components thereof. For example, the transaction handler may form the first transmission for delivery to the issuer having the GUID, the preliminary quantity of funds to be authorized for the transaction by the issuer, the merchant identifier of the merchant, the account identifier of the account, and the date of the transaction. The transaction handler may forward the authorization request without including the code for the transaction of the merchant (e.g., "5" in the example above), but including the GUID for the issuer to include in future transmissions back to the transaction handler regarding the transaction. The issuer, for example, may validate that the account is authentic or that the issuer issued the account to the consumer. The issuer or the transaction handler may conduct a risk analysis on the account to determine the level of risk in authorizing the transaction.

At a step 308, the authorization response of the issuer to the authorization request for the transaction is received. The authorization response of the issuer may include the GUID rather than the account identifier. As stated previously, the transaction handler may have stored in a database information pertaining to each of a plurality of such transactions and their corresponding GUIDs. The transaction handler may match the GUID received in the authorization response with a corresponding GUID stored in the database. In this manner, the transaction handler is thereby able to distinguish each transaction from other such transactions, and is also able to associate, within the database, the authorization response with the corresponding transaction.

At a step 310, a second transmission is formed so as to contain information for delivery to the merchant. This information will include all or part of the authorization response of the issuer. The second transmission includes the GUID, but not the account identifier. The merchant may associate the GUID in the authorization response with the transaction. For example, the merchant may store in a merchant database the GUID and information about the transaction. Depending on the authorization response, the merchant may transfer the good or service that is being purchased to the consumer, which transfer will be prior to the merchant being able to know the final quantity of funds for the transaction.

At a step 312, a third transmission is received that will include the final quantity of funds for the transaction. Once the final quantity of funds for the transaction is known, the merchant may submit the final quantity of funds along with the GUID associated with the transaction to the payment processing system, such as to the transaction handler via the merchant's acquirer. The transaction handler may utilize the GUID to associate the final quantity of funds received from the merchant with the corresponding transaction that may be stored in the database.

The submission of the final quantity of funds along with the GUID from the merchant may be in a remittance request from the merchant. Alternatively, the remittance request may be formed in a separate transmission including the GUID, wherein the transaction handler may utilize the GUID to match the remittance request with the indicia of the transaction stored in the database.

At a step 314, a fourth transmission is formed having information usable by the issuer to forward the payment such that the merchant may get paid for the transaction. For example, the transaction handler may form the fourth transmission addressed to the issuer and including a request that the issuer transfer the payment having a value equal to the final quantity of funds from the account to the merchant. The transaction handler settlement bank can deposit the payment into the acquirer settlement bank. The corresponding acquirer can withdraw the payment of the transaction from the acquirer settlement bank.

The final quantity of funds may be converted to a different currency value through the use of a foreign-to-domestic currency exchange rate. For example, a purchase made in English Pounds may be converted to a United States Dollar amount. The currency exchange rate may be date dependent wherein the value of the rate may change from one date to another. If the authorization, the clearing, and the settling occur in a window of time having a single exchange rate, then the preliminary quantity of funds being authorized may match the final quantity of funds.

Figure 4:
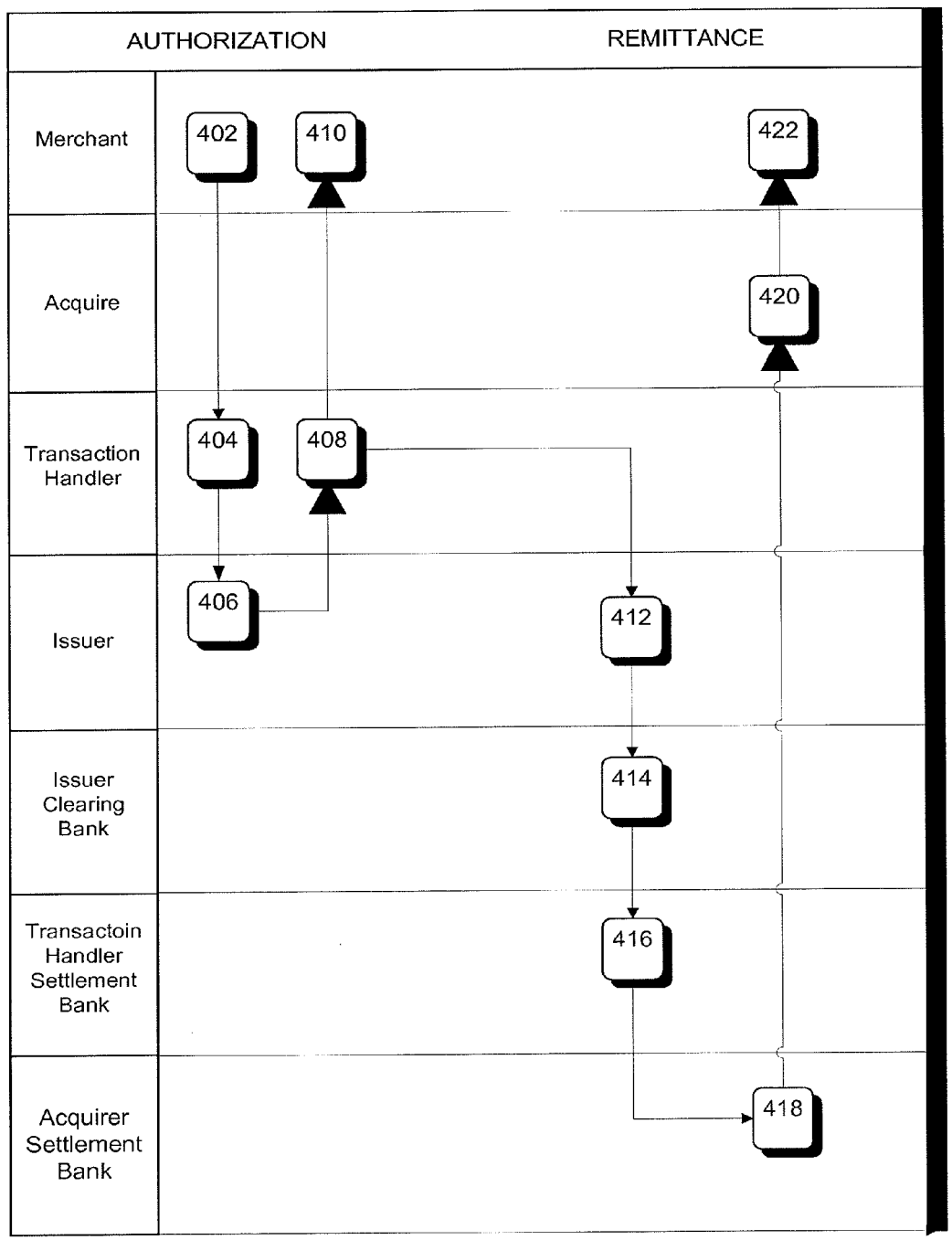
FIG. 4 depicts a cross-functional flow chart illustrating an exemplary implementation in which a merchant submits a single message request to initiate both authorization and remittance of a transaction.

Referring to FIG. 4, a cross functional flow chart illustrates an exemplary implementation in which the merchant submits a single message request to initiate both the authorization and the remittance of the transaction, using the GUID. At a step 402, the merchant may submit the single message request including the account indicator and the merchant identifier to the transaction handler via the acquirer. If the final quantity of funds is known at the time of formation of the single message request, the final quantity of funds may also be included in the single message request. At a step 404, the transaction handler may derive the GUID for the transaction and forward the GUID, along with an authorization request for the transaction, to the issuer. At a step 406, the issuer forms the authorization response and transmits it to the transaction handler along with the GUID. At a step 408, the transaction handler forwards the authorization response and the GUID, but not the account identifier, to the merchant via the acquirer. At a step 410, if the transaction is authorized by the issuer, the merchant may legally transfer the good or service to the consumer who is making the purchase.

At the step 408, the transaction handler may initiate the clearing and settling of the transaction without the merchant submitting a separate request to do so. The transaction handler may form a remittance transmission so as to contain sufficient information for the issuer to forward the payment to the merchant. The transaction handler may augment the single message request received from the merchant when forming the remittance transmission. For example, the single message request may not have a ZIP code for an address of the merchant that submitted the single message request. However, given the merchant identifier received in the single message request, the transaction handler may determine the ZIP code of the address of the merchant so that the ZIP code can be included in the remittance transmission to the issuer.

At a step 412, the issuer forwards the payment associated with the GUID to the issuer clearing bank that forwards the payment associated with the GUID to the transaction handler settlement bank at a step 414. At a step 416, the transaction handler settlement bank forwards the payment associated with the GUID to the acquirer settlement bank who in turn forwards the payment associated with the GUID to the merchant's acquirer at a step 418. At a step 420, the merchant's acquirer gives the merchant access to the payment associated with the GUID. At a step 422, the merchant may balance its accounting of the transaction by matching the GUID received in the authorization response with the GUID received with the payment. Consequently, after the merchant submits the single message request, both the authorization and the remittance of the transaction are processed within the payment processing system using the GUID.

The Payment Processing System

Figure 5:
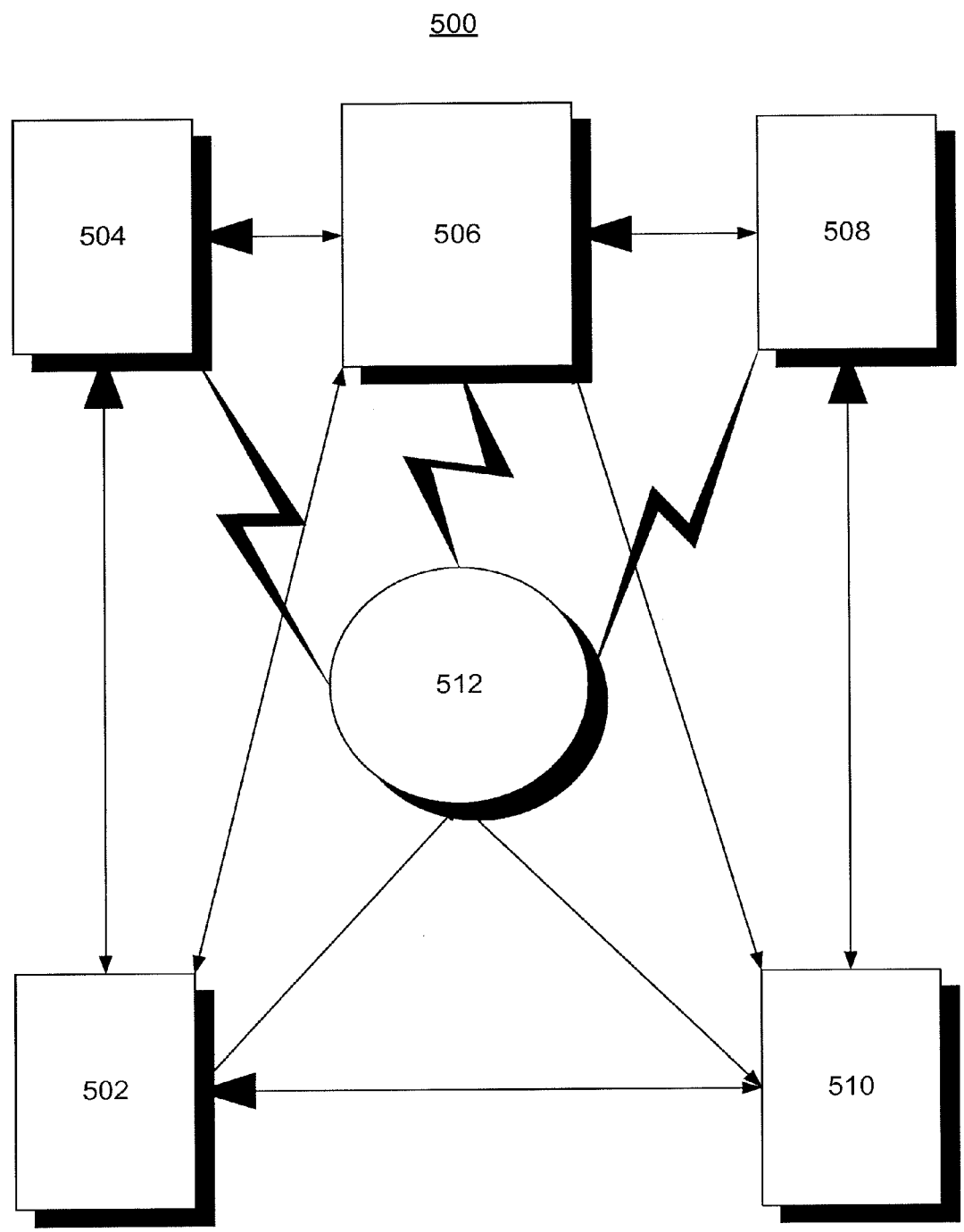
FIG. 5 depicts a block diagram of an exemplary payment processing system.

As background information for the foregoing description of a transaction in a payment processing system, as will be readily understood by persons of ordinary skill in payment processing systems, the transaction in the payment processing system can include participation from different entities that are each a component of the payment processing system. An exemplary payment processing system is depicted in FIG. 5 as a payment processing system 500. The payment processing system 500 includes an issuer 504 such as the issuer; a transaction handler 506, such as the transaction handler; an acquirer 508 such as the acquirer; a merchant 510 such as the merchant; and a consumer 502 such as the consumer. The acquirer 508 and the issuer 504 can communicate through the transaction handler 506. The merchant 510 may utilize at least one of the POS terminals that can communicate with the acquirer 508, the transaction handler 506, or the issuer 504. Thus, the POS is in operative communication with the payment processing system 500.

Typically, the transaction begins with the consumer 502 presenting a corresponding account identifier of the account such as through the use of a computer terminal or a portable consumer device 512 to the merchant 510 to initiate an exchange for a good or service. The consumer 502 may be an individual or a corporate entity. The consumer 502 may be an account holder of the account issued by the issuer 504 such as a joint account holder of the account or a person having access to the account such as an employee of a corporate entity having access to a corporate account. The portable consumer device 512 may include a payment card, a gift card, a smartcard, a smart media, a payroll card, a health care card, a wrist band, a machine readable medium containing account information, a keychain payment device such as the SPEEDPASS® payment device which is commercially available from ExxonMobil Corporation, or a supermarket discount card, a cellular phone, personal digital assistant, a pager, a security card, a computer, an access card, a wireless terminal, or a transponder, for example. The portable consumer device 512 may include a volatile or a non-volatile memory to store information such as the account number or a name of the account holder.

The merchant 510 may use an acceptance point device, such as a POS terminal, to obtain account information, such as the account identifier, from the portable consumer device 512. The portable consumer device 512 may interface with the POS terminal using a mechanism including any suitable electrical, magnetic, or optical interfacing system such as a contactless system using radio frequency, a magnetic field recognition system, or a contact system such as a magnetic stripe reader. The POS terminal sends the authorization request to the issuer 504 of the portable consumer device 512. Alternatively, or in combination, the portable consumer device 512 may communicate with the issuer 504, the transaction handler 506, or the acquirer 508.

The issuer 504 may submit the authorization response for the transaction via the transaction handler 506. Authorization includes the issuer 504, or the transaction handler 506 on behalf of the issuer 504, authorizing the transaction in connection with instructions of the issuer 504, such as through the use of business rules. The transaction handler 506 may maintain a log or history of authorized transactions. Once approved, the merchant 510 can record the authorization and allow the consumer 502 to receive the good or service.

The merchant 510 may, at discrete periods, such as the end of the day, submit a list of authorized transactions to the acquirer 508 or other components of the payment processing system 500 for clearing and settling. The transaction handler 506 may compare the submitted authorized transaction list with its own log of authorized transactions. If a match is found, the transaction handler 506 may route the clearing and settling request from the corresponding acquirer 508 to the corresponding issuer 504 involved in each transaction. Once the acquirer 508 receives the payment of the transaction from the issuer 504, it can forward the payment to the merchant 510 less any transaction costs, such as fees. If the transaction involves a debit or pre-paid card, the acquirer 508 may choose not to wait for the initial payment prior to paying the merchant 510.

There may be intermittent steps in the foregoing process, some of which may occur simultaneously. For example, the acquirer 508 can initiate the clearing and settling process, which can result in payment to the acquirer 508 for the amount of the transaction. Alternatively, or in combination, the acquirer 508 may request from the transaction handler 506 that the transaction be cleared and settled.

It should be understood implementations can be in the form of control logic, in a modular or integrated manner, using software, hardware or a combination of both. The steps of a method, process, or algorithm described in connection with the implementations disclosed herein may be embodied directly in hardware, in a software module executed by a processor, or in a combination of the two.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A method comprising:
   receiving, by an issuer computer, an authorization request for a transaction between a consumer and a merchant, the authorization request including an amount of funds to be authorized for the transaction, an account identifier associated with the consumer, and a Globally Unique Identifier (GUID) associated with the transaction of the merchant wherein the GUID is unique among a plurality transactions of a plurality of merchants;
   associating, by the issuer computer, the GUID in the authorization request message with the transaction;
   storing, by the issuer computer, the GUID associated with the transaction, and information associated with the transaction, for use in subsequent processing of the transaction;
   determining, by the issuer computer, that the transaction is approved based on an account associated with the account identifier; and
   sending, by the issuer computer, an authorization response that does not include the account identifier but that includes the GUID, and an indication that the transaction was approved.

2. The method of claim 1 wherein the authorization request is received from a transaction handler computer.

3. The method of claim 1 wherein the amount of funds to be authorized for the transaction is a preliminary quantity of funds and wherein the method further comprises:
   receiving, by the issuer computer, an updated authorization request comprising a final quantity of funds and the GUID.

4. The method of claim 1 wherein the GUID was derived using an algorithm without having the account identifier as an input to the algorithm.

5. The method of claim 1 wherein the stored information associated with the transaction includes a merchant identifier and a date.

6. An issuer computer comprising a processor and a non-transitory computer readable medium storing computer readable code configured to be executed by the processor to:

receive an authorization request for a transaction between a consumer and a merchant, the authorization request including an amount of funds to be authorized for the transaction, an account identifier associated with the consumer, and a Globally Unique Identifier (GUID) associated with the transaction of the merchant wherein the GUID is unique among a plurality transactions of a plurality of merchants;

associate the GUID in the authorization request message with the transaction;

store the GUID associated with the transaction, and information associated with the transaction, for use in subsequent processing of the transaction;

determine that the transaction is approved based on an account associated with the account identifier; and send an authorization response that does not include the account identifier but that includes the GUID, and an indication that the transaction was approved.

7. The issuer computer of claim 6 wherein the authorization request is received from a transaction handler computer.

8. The issuer computer of claim 6 wherein the amount of funds to be authorized for the transaction is a preliminary quantity of funds and wherein the computer readable code is further configured to be executed by the processor to:

receive an updated authorization request comprising a final quantity of funds and the GUID.

9. The issuer computer of claim 6 wherein the account information is obtained from a portable consumer device associated with the consumer.

10. The issuer computer of claim 6 wherein the GUID was derived using an algorithm without having the account identifier as an input to the algorithm.

11. A method comprising:

obtaining, by an acceptance point device associated with a merchant, account information, including an account identifier, from a consumer to conduct a transaction with the merchant;

sending, by the acceptance point device associated with the merchant, an authorization request having a code for the transaction that is unique among a plurality of transactions of the merchant in a plurality of merchants, an amount of funds to be authorized for the transaction, and the account identifier;

receiving, by the acceptance point device associated with the merchant, an authorization response message that does not include the account identifier but that includes a Globally Unique Identifier (GUID) associated with the transaction of the merchant wherein the GUID is unique among a plurality of transactions of a plurality of merchants, the code for the transaction, and an indication of whether the transaction was approved;

associating the GUID in the authorization response message with the transaction; and storing the GUID associated with the transaction instead of the account identifier, the code for the transaction, and information associated with the transaction, for use in subsequent processing of the transaction.

12. The method of claim 11 wherein the amount of funds to be authorized for the transaction is a preliminary quantity of funds and wherein the method further comprises:

transmitting an updated authorization request comprising a final quantity of funds and the GUID.

13. The method of claim 11 wherein the code for the transaction is a date on which the authorization request was formed, a merchant identifier of the merchant, or a logical address corresponding to the location of the merchant device.

14. The method of claim 11 wherein the code for the transaction is created using a pseudo random number generator.

15. The method of claim 11 wherein before sending the authorization request message the method further comprises:

generating the code for the transaction.

16. A merchant system comprising a processor and a non-transitory computer readable medium storing computer readable code configured to be executed by the processor to:

obtain account information, including an account identifier, from a consumer to conduct a transaction with the merchant;

send an authorization request having a code for the transaction that is unique among a plurality of transactions of the merchant in a plurality of merchants, an amount of funds to be authorized for the transaction, and the account identifier;

receive an authorization response message that does not include the account identifier but that includes a Globally Unique Identifier (GUID) associated with the transaction of the merchant wherein the GUID is unique among a plurality of transactions of a plurality of merchants, the code for the transaction, and an indication of whether the transaction was approved;

associate the GUID in the authorization response message with the transaction; and store the GUID associated with the transaction instead of the account identifier, the code for the transaction, and information associated with the transaction, for use in subsequent processing of the transaction.

17. The merchant system of claim 16 wherein the amount of funds to be authorized for the transaction is a preliminary quantity of funds and wherein the computer readable code is further configured to be executed by the processor to:

transmit an updated authorization request comprising a final quantity of funds and the GUID.

18. The merchant system of claim 16 wherein the account information is obtained from a portable consumer device associated with the consumer.

19. The merchant system of claim 16 wherein the code for the transaction is unique among the plurality of transactions of the merchant but not unique across merchants within a payment processing system.

20. The merchant system of claim 16 wherein the GUID was derived using an algorithm without having the account identifier as an input to the algorithm.

* * * * *